United States Patent
Maestro Ruiz De Temino et al.

(10) Patent No.: US 12,271,252 B2
(45) Date of Patent: Apr. 8, 2025

(54) INCREASING THE ROBUSTNESS OF ELECTRONIC SYSTEMS AGAINST SEU AND OTHER RADIATION EFFECTS

(71) Applicant: Nokia Solutions and Networks Oy, Espoo (FI)

(72) Inventors: Luis Angel Maestro Ruiz De Temino, San Francisco, CA (US); Jerzy Kolek, Wlosan (PL); Slawomir Cichon, Paszkowka (PL); Pratibha Gupta, Menlo Park, CA (US); Gustav Derkits, New Providence, NJ (US); Kiran Patel, Piscataway, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/979,940

(22) Filed: Nov. 3, 2022

(65) Prior Publication Data
US 2024/0152416 A1   May 9, 2024

(51) Int. Cl.
*G06F 11/00* (2006.01)
*G06N 7/01* (2023.01)

(52) U.S. Cl.
CPC .......... *G06F 11/004* (2013.01); *G06F 11/008* (2013.01); *G06N 7/01* (2023.01); *G06F 2201/805* (2013.01)

(58) Field of Classification Search
CPC .................. G06F 11/004; G06F 11/008; G06F 2201/805; G06N 7/01
See application file for complete search history.

(56) References Cited

U.S. PATENT DOCUMENTS

| | | | |
|---|---|---|---|
| 10,901,097 B1* | 1/2021 | Karp | G01R 31/2851 |
| 11,966,284 B1* | 4/2024 | Lameres | G06F 11/0793 |
| 12,042,326 B2* | 7/2024 | Burr | A61B 6/037 |
| 2009/0189082 A1* | 7/2009 | Stahmann | A61N 1/37 250/370.07 |
| 2009/0290461 A1* | 11/2009 | Van Endert | G11B 7/094 |
| 2012/0065919 A1* | 3/2012 | Brown | G01R 31/31724 702/117 |
| 2012/0297259 A1* | 11/2012 | Haufe | G06F 11/24 714/726 |
| 2015/0143200 A1* | 5/2015 | Chinnakkonda Vidyapoornachary | G06F 11/2015 714/770 |
| 2019/0244056 A1* | 8/2019 | Roy | G06N 7/01 |
| 2020/0110685 A1* | 4/2020 | Chew | G06F 11/3037 |
| 2020/0188692 A1* | 6/2020 | Liu | A61N 5/1031 |

(Continued)

*Primary Examiner* — Loan L. T. Truong
(74) *Attorney, Agent, or Firm* — McCarter & English, LLP

(57) ABSTRACT

An electronic device fetches first information from memory devices concerning errors associated with radiation effects in the memory devices and fetches second information about system performance associated with the electronic device. The electronic device monitors current parameters of the memory devices and calculates parameter values for configuration of the memory devices based on the fetched first information, the fetched second information, and the monitored current parameters, the calculating performed to adjust the parameter values to improve a metric of the system performance against the errors associated with the radiation. The electronic device implements the calculated parameter values for the configuration of the memory devices.

20 Claims, 6 Drawing Sheets

(56) References Cited

U.S. PATENT DOCUMENTS

| | | | |
|---|---|---|---|
| 2021/0191804 A1* | 6/2021 | Tao | G06F 11/0793 |
| 2021/0397891 A1* | 12/2021 | Memon | H04L 9/3239 |
| 2023/0051590 A1* | 2/2023 | Tkacik | G06F 11/1076 |
| 2023/0062652 A1* | 3/2023 | Xu | G11C 16/3404 |
| 2024/0028457 A1* | 1/2024 | Kalte | G06F 11/10 |

* cited by examiner

INCREASING THE ROBUSTNESS OF ELECTRONIC SYSTEMS AGAINST SEU AND OTHER RADIATION EFFECTS

TECHNICAL FIELD

Exemplary embodiments herein relate generally to electronic systems and, more specifically, relates to increasing the robustness of electronic systems against single event upset (SEU) and other radiation effects.

BACKGROUND

Wireless communications systems are growing in complexity to meet the demands for higher data rates and performance. These systems employ advanced chipsets like systems on a System on a Chip (SoC), dynamic random-access memory (DRAM), static random-access memory (SRAM), field programmable gate array (FPGA) modules, and the like, that pack more and more capabilities into smaller and smaller areas and node technology.

While these technologies and chipsets enable the wireless systems to increase their performance in small form factor solutions, these could also make the systems more susceptible to radiation-induced single event effects (SEEs) due to the higher packing densities.

Traditionally, radiation SEE impacts and solutions have been intensively studied for aerospace applications, e.g., protection against cosmic galactic rays (CGRs) or in scenarios where radiation is inherently present such as, e.g., in electronics used in nuclear plants. Today, however, there is a growing concern in the wireless industry about the impact of e.g., neutron radiation in commercial wireless systems on regular Earth deployments.

In addition, the space industry is moving from heavily custom-based solutions to service-based requirements and re-use of commercial-off-the-shelf (COTS) technologies to enable a growing space ecosystem. Through NASA's private-public partnerships, the first LTE/4G (long term evolution/fourth generation) communications network will be used on the Moon. It is clear that 3GPP-based technologies are a solid candidate for proximity communications in future space missions.

As space exploration grows, and space agencies increasingly rely on public/private partnerships to lower costs, the use and adaptation of terrestrial communication systems, with commercial-off-the-shelf parts, will increase. In addition to traditional radiation-hardened components and hardware solutions, software mitigations of the effects of SEEs may make these technologies cost effective and increase their likelihood to be broadly adopted by the space industry.

BRIEF SUMMARY

This section is intended to include examples and is not intended to be limiting.

A method includes fetching, by an electronic device, first information from memory devices concerning errors associated with radiation effects in the memory devices and fetching, by the electronic device, second information about system performance associated with the electronic device. The method includes monitoring, by the electronic device, current parameters of the memory devices. The method further includes calculating, by the electronic device, parameter values for configuration of the memory devices based on the fetched first information, the fetched second information, and the monitored current parameters, the calculating performed to adjust the parameter values to improve a metric of the system performance against the errors associated with the radiation. The method also includes implementing by the electronic device the calculated parameter values for the configuration of the memory devices.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

A further exemplary embodiment is an electronic device that comprises at least one processor, and at least one memory storing instructions that, when executed by the least one processor, cause the electronic device to perform: fetching first information from memory devices in the at least one memory concerning errors associated with radiation effects in the memory devices; fetching second information about system performance associated with the electronic device; monitoring current parameters of the memory devices; calculating parameter values for configuration of the memory devices based on the fetched first information, the fetched second information, and the monitored current parameters, the calculating performed to adjust the parameter values to improve a metric of the system performance against the errors associated with the radiation; and implementing the calculated parameter values for the configuration of the memory devices.

Another exemplary embodiment is a computer-readable storage medium that comprises program instructions that, when executed by an electronic device, cause the electronic device to perform: fetching, by the electronic device, first information from memory devices concerning errors associated with radiation effects in the memory devices; fetching, by the electronic device, second information about system performance associated with the electronic device; monitoring, by the electronic device, current parameters of the memory devices; calculating, by the electronic device, parameter values for configuration of the memory devices based on the fetched first information, the fetched second information, and the monitored current parameters, the calculating performed to adjust the parameter values to improve a metric of the system performance against the errors associated with the radiation; and implementing by the electronic device the calculated parameter values for the configuration of the memory devices.

A further exemplary embodiment is an electronic device, comprising means for performing: fetching first information from memory devices concerning errors associated with radiation effects in the memory devices; fetching second information about system performance associated with the electronic device; monitoring current parameters of the memory devices; calculating parameter values for configuration of the memory devices based on the fetched first information, the fetched second information, and the monitored current parameters, the calculating performed to adjust the parameter values to improve a metric of the system performance against the errors associated with the radiation; and implementing the calculated parameter values for the configuration of the memory devices.

DETAILED DESCRIPTION OF THE DRAWINGS

Figure 1:
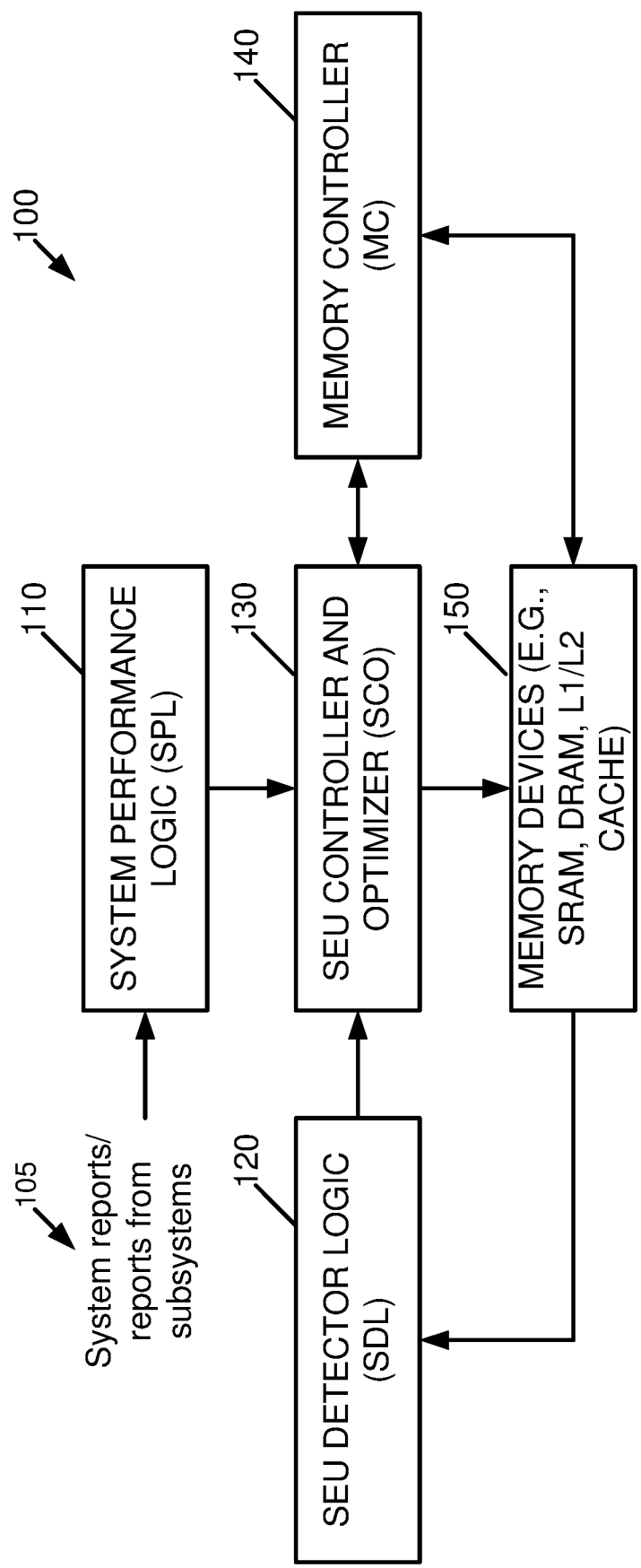
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Radiation SEE can manifest in the form of single event upsets (SEUs) or soft errors which can, e.g., cause a state change on a memory device, i.e., a bit flip (from a first value such as one, to a second value such as zero). These are normally recoverable effects and many chipsets today include error detection and correction (EDAC) capabilities that can cope with this provided that the rate of SEU is low in comparison to the EDAC recovery frequency. However, when the SEU rate increases, and EDAC solutions (if available) cannot correct the bit flips fast enough, then the system's performance degrades and can eventually lead to a fatal error, causing a system to hang or reset, or be forced to be reset for recovery.

There exist a lot of literature and solutions regarding EDAC, radiation-hardened devices, and the like, especially from the aerospace industry. However, these solutions tackle the radiation-impact on, e.g., a chipset/device level and/or fabrication processes. That is, these solutions target to build components that are radiation-hardened by design and, when used in a complete system, it is expected that the overall system reliability and robustness is increased. However, a system-wide robustness solution for COTS equipment such as the one presented herein is not available.

The exemplary embodiments aim at increasing the robustness of commercial-off-the-shelf (COTS) wireless systems against radiation SEU in a cost-effective manner, without the need of using complex and expensive radiation-hardened electronics and processes. Furthermore, methods are disclosed herein that aim at effectively coping with SEU i.e., bit-flips in COTS systems, by exploiting the capabilities of real-time error detection and memory re-configuration.

As an overview, an exemplary embodiment provides a method to increase the robustness of (e.g., 4G and 5G) wireless-systems against radiation by modifying in real-time, several configurations of the memory devices and by self-optimizing based on SEU rate and desired system performance. Exemplary building blocks include the following:

a) SEU detection logic (SDL), which detects and counts in real-time the number of bit-flips.

b) System Performance Logic (SPL), which provides input regarding system resets, and/or capacity estimation.

c) A memory controller (MC), which implements changes to the memory devices such as cache-size modification, cache invalidation and/or scrubbing frequency.

d) An SEU controller and optimizer (SCO), which uses inputs from SEU detection logic and system performance metrics to calculate the (e.g., optimized) values for the memory controller to implement.

It is noted that all of (a) to (d) can be implemented at least partially or completely in instructions in computer program code (e.g., software), which are stored in memory (or memories) and executed by one or more processors. For instance, although part of a memory controller may be implemented in circuitry, e.g., the part that physically connects to memory devices, part may be implemented by instructions that dictate changing cache sizes, cache invalidation, scrubbing frequency, and other cache operations.

Unlike traditional component-level mitigations, this approach monitors system-level performance metrics, based on utilization and/or frequency of memory access and takes into account corrections throughout the memory hierarchy. In addition, the examples herein provide a new method and logic for an SEU controller and optimizer to calculate the (e.g., optimum) values of the memory parameters to maximize the system resiliency while at the same time maintaining performance without using expensive radiation-hardened solutions.

Further, some level of experimental validation has been performed on a prototype LTE BTS, subjecting the system to a radiation beam and confirming that different memory parameter settings improve the performance of the system against SEU. Additionally, the exemplary embodiments provide mechanisms to fully automate the process of finding and setting the (e.g., optimal) memory parameters for each scenario.

Now that an overview has been provided, more details are provided. Turning to FIG. 1, this figure is a block diagram of one possible and non-limiting exemplary system 100 in which the exemplary embodiments may be practiced. The main building blocks were introduced in the overview, and are described in more detail now. The system 100 includes system performance logic (SPL 110) that is coupled to an SEU controller and optimizer (SCO) 130. The SCO 130 is coupled to SEU detector logic (SDL) 120 and a memory controller (MC) 140. The SDL 120, the SCO 130, and the MC 140 are coupled to the memory devices 150, which may be SRAM, DRAM, L1/L2 cache or the like.

Figure 2:
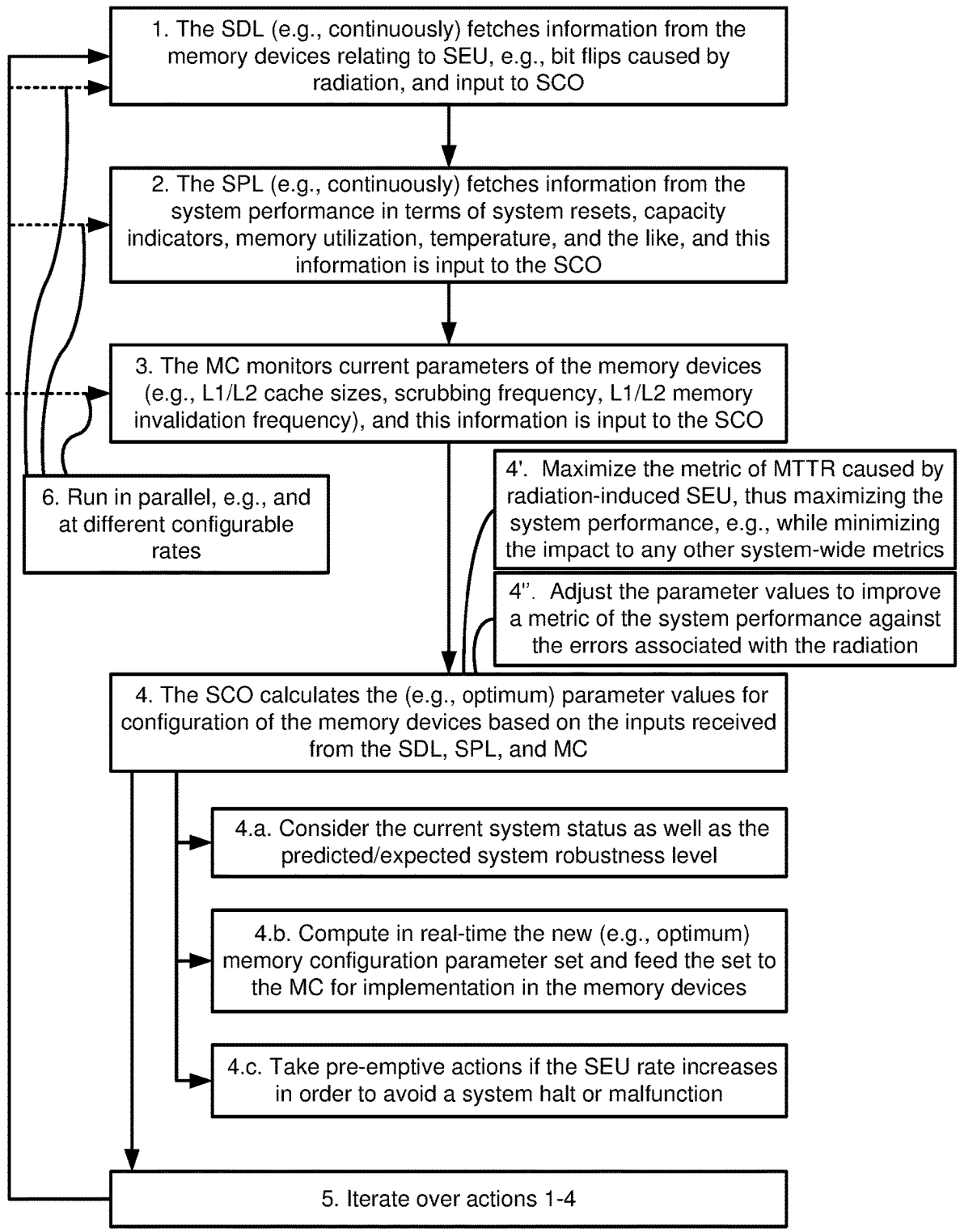
FIG. 2 is a logic flow diagram for increasing the robustness of wireless-systems against radiation.

Operation of these is best explained through a logic flow diagram. FIG. 2 is a logic flow diagram for increasing the robustness of wireless-systems against radiation. FIG. 2 illustrates the operation of an exemplary method, a result of execution of computer program instructions embodied on a computer readable memory, functions performed by logic implemented in program code that acts on hardware and corresponding memory configuration, and/or interconnected means for performing functions in accordance with an exemplary embodiment.

From an implementation perspective, the following actions may be performed. See also FIG. 1 for one possible structure for these elements.

Action 1. The SEU Detector Logic (SDL) 120 (e.g., continuously) fetches information from the memory devices 150 relating to SEU, e.g., bit flips caused by radiation. This information is input to the SEU Controller and Optimizer (SCO) 130. It is noted that bit flips could be caused by means other than radiation, but at a much lower rate as compared to radiation. Since the intended operation of the systems described herein is space (or other areas with higher radiation field), bit flips are assumed to be mainly caused by radiation.

Action 2. The System Performance Logic (SPL) 110 (e.g., continuously) fetches information from the system performance in terms of system resets, capacity indicators, memory utilization, temperature (e.g., of device(s) on the system, including potentially memory device(s) 150), and the like. This example has the SPL 100 accessing system reports/reports from subsystems in reference 105 to determine system performance information that is then input to the SCO 130.

Action 3. The Memory Controller (MC) 140 monitors current parameters of the memory devices (e.g., L1/L2 cache sizes, scrubbing frequency, L1/L2 memory invalidation frequency). This information is input to the SCO 130. It is noted that memory scrubbing includes reading from each memory location, correcting bit errors (if any), e.g., with an error-correcting code (ECC), and writing the corrected data back to the same location. Cache invalidation is a process wherein entries in a cache are replaced or removed.

Action 4. The SCO 130 calculates the (e.g., optimum) parameter values for the configuration of the memory devices based on the inputs received from SDL 120, SPL 110, and MC 140. The parameter values could be memory scrubbing, cache size, memory invalidation, as examples. These are examples for a cache but other memories could be used. It is noted that there is a tradeoff in that, when modifying the memory configuration to be more robust against SEU, one also takes a hit on, e.g., system capacity, so in a way the system performance may be degraded as compared to with no radiation flux. With radiation flux, however, an algorithm can be used that adjusts (e.g., optimizes) the memory values to improve (e.g., maximize) MTTR and therefore system performance. Thus, the algorithm (e.g., see Action 4') then aims at maximizing the metric of MTTR caused by radiation-induced SEU, thus maximizing the system performance (while in a radiation flux), e.g., while minimizing the impact to any other system-wide metrics, such as capacity. More broadly, in Action 4", the algorithm, when calculating, can adjust the parameter values to improve a metric of the system performance against the errors associated with the radiation.

In action 4.a., the algorithm may take into consideration the current system status as well as the predicted/expected system robustness level. The algorithm then computes, in action 4.b and in real-time, the new optimum memory configuration parameter set and feeds the set to the MC for implementation in the memory devices. The SCO could also take, see action 4.c., pre-emptive actions if the SEU rate increases in order to avoid a system halt or malfunction. For instance, parameter values could be modified to more conservative ones to preempt a future system failure. As an example, perhaps memory scrubbing could be increased in a number of times per time period, which would decrease the number of errors that affect the memory per time period.

Action 5. Iterate over Actions 1 to 4.

It is noted that Actions 1, 2 and 3 can be run in parallel, e.g., and at different configurable rates. This is illustrated by Action 6. The rates are the rates of fetching or monitoring System robustness level may be measured with e.g., mean time to reset (MTTR) as one metric. In further detail, bit flips can eventually cause a system hang or trigger a system reset. Mean-time-to-reset is one exemplary measure of system robustness against radiation (e.g., a system resets every 24 hours). Larger MTTR means more robust system performance against radiation. Other metrics that can be used independently or in combination are system uptime, data integrity, sustainable throughput, or capacity (e.g., overall system capacity in terms of # of simultaneous users or maximum data rates as an example). The algorithm (e.g., see Action 4') then aims at maximizing the metric of MTTR caused by radiation-induced SEU while maximizing the system performance. That is, another way to implement Action 4 is to implement action 4'. This can be performed via techniques known to those skilled in this area, such as increasing the MTTR via the parameter values, measuring the system performance by a metric such as throughput, further increasing the MTTR via the parameter values, remeasuring the performance using the metric, and continuing this until one or more criteria are met. Metrics other than MTTR may be used, such as minimizing downtime or maximizing availability of the electronic system, both performed in presence of radiation-induced SEE.

The starting point of the algorithm (and the initial memory configuration parameter set) can be manually configured depending on the scenario in which the wireless system is to operate. The starting point is the default memory configuration of the system, e.g., a larger cache size means less frequent access to those memories and therefore a more efficient system operation under those conditions. In presence of radiation, however, cache size needs to be reduced to limit the impact of radiation induced errors. As there is a tradeoff between scrubbing, invalidation, cache size and performance (e.g., more frequent L1/L2 invalidation can cause unnecessary fetching of data from lower-level memories and thus reduce overall system performance overall), it is desired to have pre-set configurations for different scenarios. However, it is infeasible to manually configure and optimize the overall system for each possible scenario. Therefore, an exemplary embodiment herein also proposes a closed-loop optimization algorithm with a machine learning (ML) system performance metric estimator to enable fully autonomous system self-optimizing.

Based on experimental data from system-wide radiation testing, it has been shown that certain memory configuration sets (scrubbing, cache size, invalidation) improve the overall system performance (in terms of MTTR) over a particular proton flux. Different flux values, ambient temperature, solar load, equipment orientation, radiation particle cocktails, and the like are expected to require different configuration sets and therefore the proposed techniques with self-optimizing algorithms become increasingly important. The examples herein with the corresponding methods aim at providing an optimal configuration of the memory parameters in a self-optimizing manner, taking into account the performance tradeoffs to increase the robustness of the wireless systems as a whole.

A more detailed view of one proposed real-time closed-loop self-optimization algorithm is now described in relation to SEU Controller and Optimizer (SCO) implementation.

Figure 3:
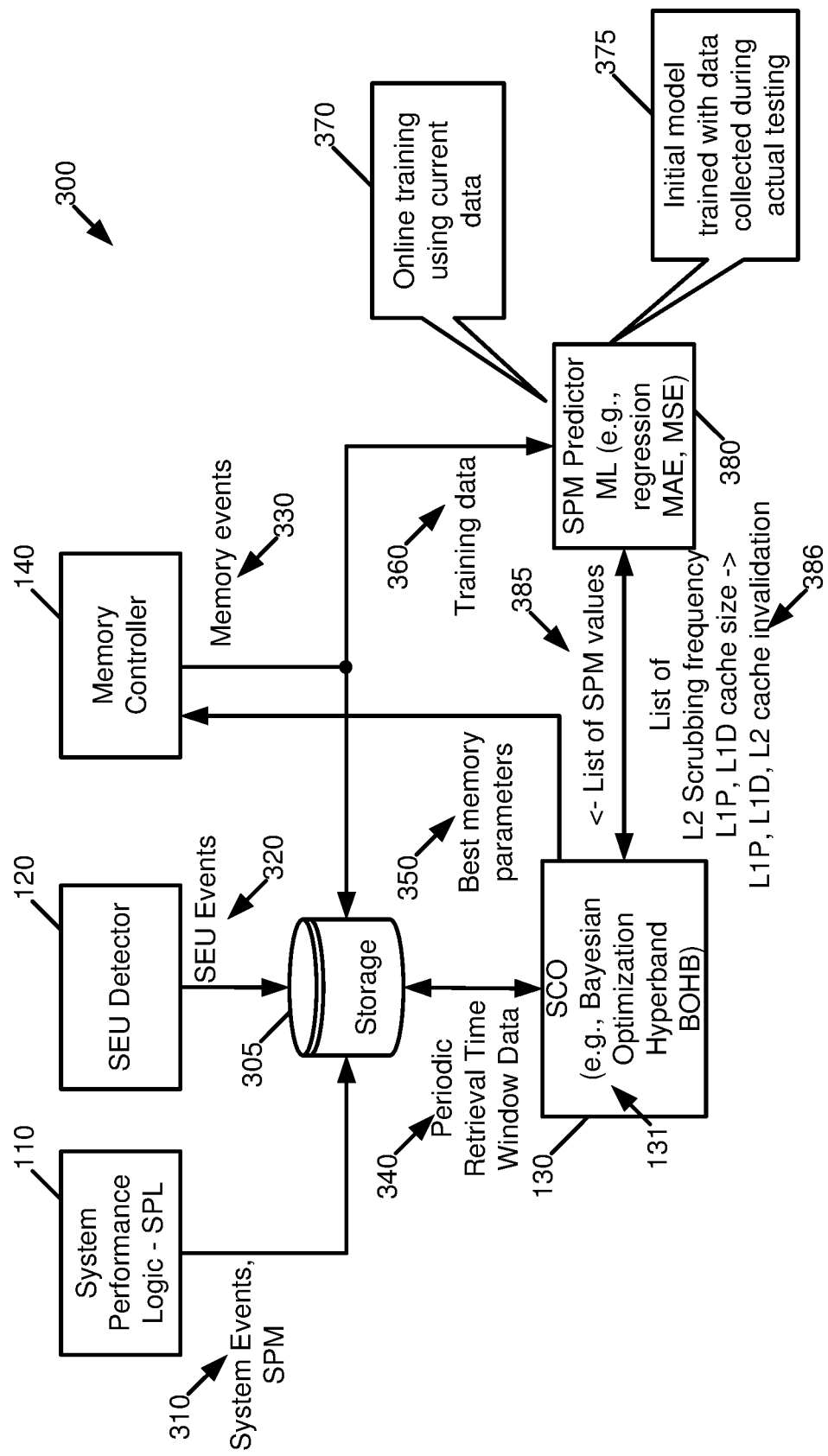
FIG. 3 is a block diagram of the main entities involve in a real-time closed-loop self-optimization algorithm.
Figure 4:
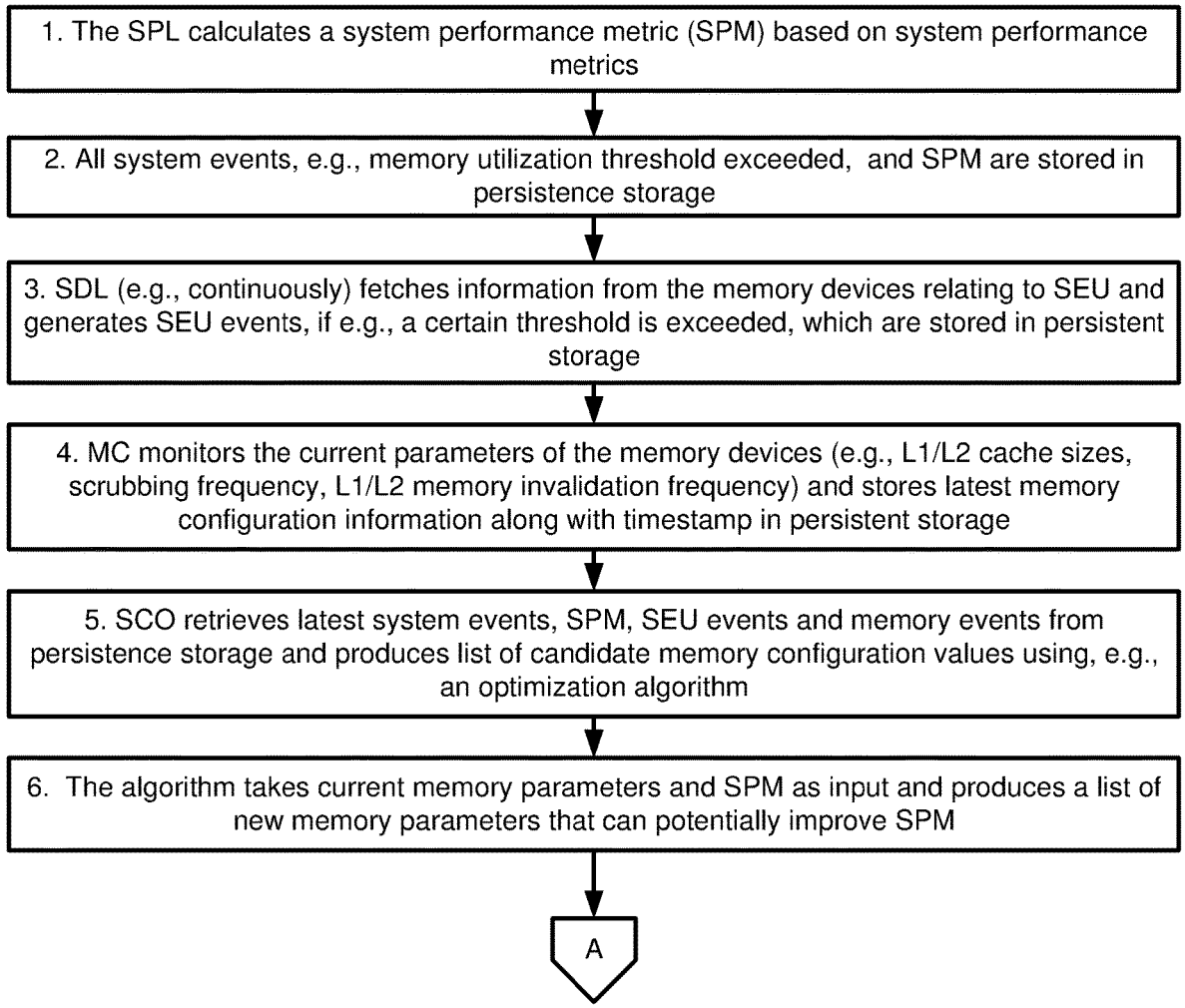
FIG. 4 is a logic flow diagram of the actions performed by the entities in FIG. 3.
Figure 4:
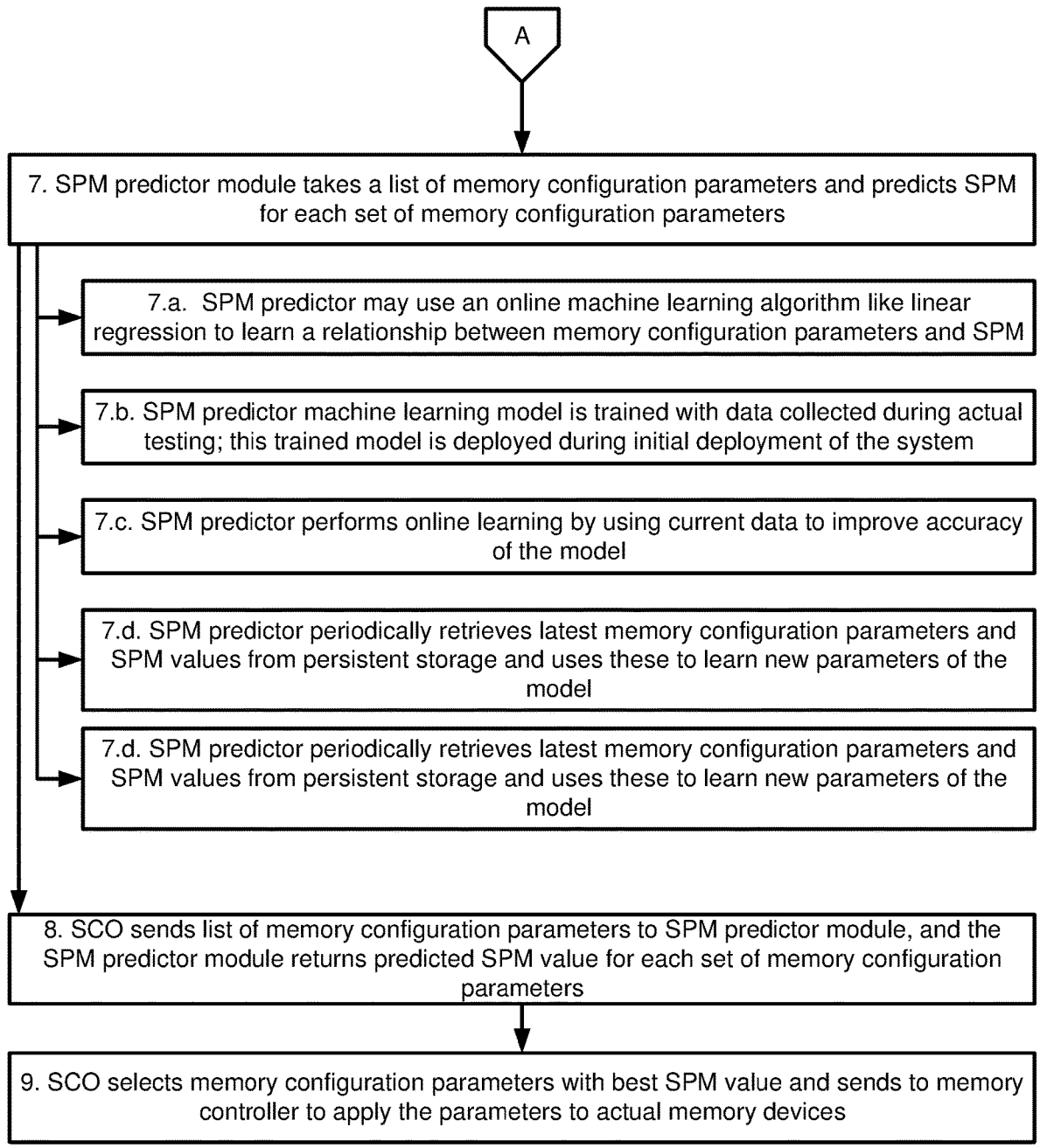

The SCO 130 may implement a real-time closed loop self-optimization algorithm to generate (e.g., optimum) parameter values for the memory devices configuration. Referring to FIGS. 3 and 4, FIG. 3 is a block diagram of a real-time closed-loop self-optimization algorithm 300, while FIG. 4 is a logic flow diagram of the actions performed by the entities in FIG. 3. FIGS. 3 and 4 also illustrates the operation of an exemplary method, a result of execution of computer program instructions embodied on a computer readable memory, functions performed by logic implemented in program code that acts on hardware and corresponding memory configurations, and/or interconnected means for performing functions in accordance with an exemplary embodiment. The main exemplary blocks in FIG. 3 are the SPL 110, SDL 120, MC 140, persistent storage 305, SCO 130, and SPM predictor module 380. The persistent storage 305 used in this example retains its memory while in an off state. These blocks operate as per the actions in FIG. 4.

Action 1. System Performance Logic (SPL) 110 calculates a weighted average system performance metric (SPM) based on system performance metrics like system resets, capacity indicators, memory utilization, temperature, and the like.

Action 2. All system events, e.g., memory utilization threshold exceeded, and SPM are stored in persistent storage 305. See reference 310 in FIG. 3 also.

Action 3. SEU Detector Logic (SDL) 120 continuously fetches information from the memory devices relating to SEU and generates SEU events 320, if e.g., a certain threshold is exceeded, which are stored in persistent storage 305.

Action 4. Memory Controller (MC) 140 monitors the current parameters of the memory devices (e.g., L1/L2 cache sizes, scrubbing frequency, L1/L2 memory invalidation frequency) and stores latest memory configuration information along with timestamp in persistent storage 305 as memory events 330.

Action 5. SCO 130 retrieves (see periodic retrieval time window data 340) the latest system events, SPMs, SEU events 320 and memory events 330 from persistent storage 305 and produces a list of candidate memory parameter values (e.g., cache sizes, scrubbing period, invalidation frequency) using an algorithm like BOHB, Bayesian Optimization HyberBand (see Faulkner et al., "BOHB: Robust and Efficient Hyperparameter Optimization at Scale", published at ICML 2018, arXiv:1807.01774).

Action 6. The (e.g., BOHB optimization) algorithm 131, implemented by the SCO 130, takes current memory parameters and SPM as input and produces a list of new memory parameters that can potentially improve SPM. If BOHB is used, this is an iterative algorithm that learns relationship between memory parameters and SPM over a period. It uses this knowledge to provide new memory parameter values.

Action 7. In real and live systems, it is not possible to try all the memory configuration parameter values and find out which values provides the best SPM. In order to find the best memory configuration parameters values, and exemplary embodiment uses an SPM predictor module. SPM predictor module 380 takes a list of memory configuration parameters and predicts SPM for each set of memory configuration parameters.

Action 7.a. SPM predictor 380 may use an online machine learning algorithm like linear regression to learn a relationship between memory configuration parameters and SPM. Mean Absolute Error (MAE) and Mean Squared Error (MSE) accuracy metric may be used to measure accuracy of the model.

Action 7.b. SPM predictor machine learning model is trained with data 360 collected during actual testing. See also reference 375. This trained model is deployed during initial deployment of the system.

Action 7.c. SPM predictor performs online learning by using current data to improve accuracy of the model. See also reference 370.

Action 7.d. SPM predictor periodically retrieves latest memory configuration parameters and SPM values from persistent storage 305 and uses these to learn new parameters of the model. This ensures that system adapts to changing conditions.

Action 8. SCO 130 sends list of memory configuration parameters to the SPM predictor module 380. SPM predictor module 380 returns predicted SPM value for each set of memory configuration parameters. The SPM predictor ML module 380 may perform ML techniques such as regression analysis to determine Mean Absolute Error (MAE) and Mean Squared Error (MSE) accuracy metrics (or other metrics used to determine accuracy of a model). The SPM predictor ML module 380 sends a list 385 of SPM values to the SCO. A list 386 is sent from the SCO 130 to the SPM predictor ML block 308, e.g., for training the ML. The list includes the following information in this example: L2 Scrubbing frequency; LiP, LiD cache size; and LiP, LiD, L2 cache invalidation. The SPM predictor ML module 380 uses the memory specific parameters as per this information to calculate/predict (e.g., in a training mode) an SPM value. This value is returned in the list 385 to the SCO for future optimizations.

Action 9. SCO selects memory configuration parameters with best SPM value and sends (as best memory parameters 350) to the memory controller 140 to apply the parameters to actual memory devices 150 (see FIG. 1 for memory devices 150).

Figure 5:
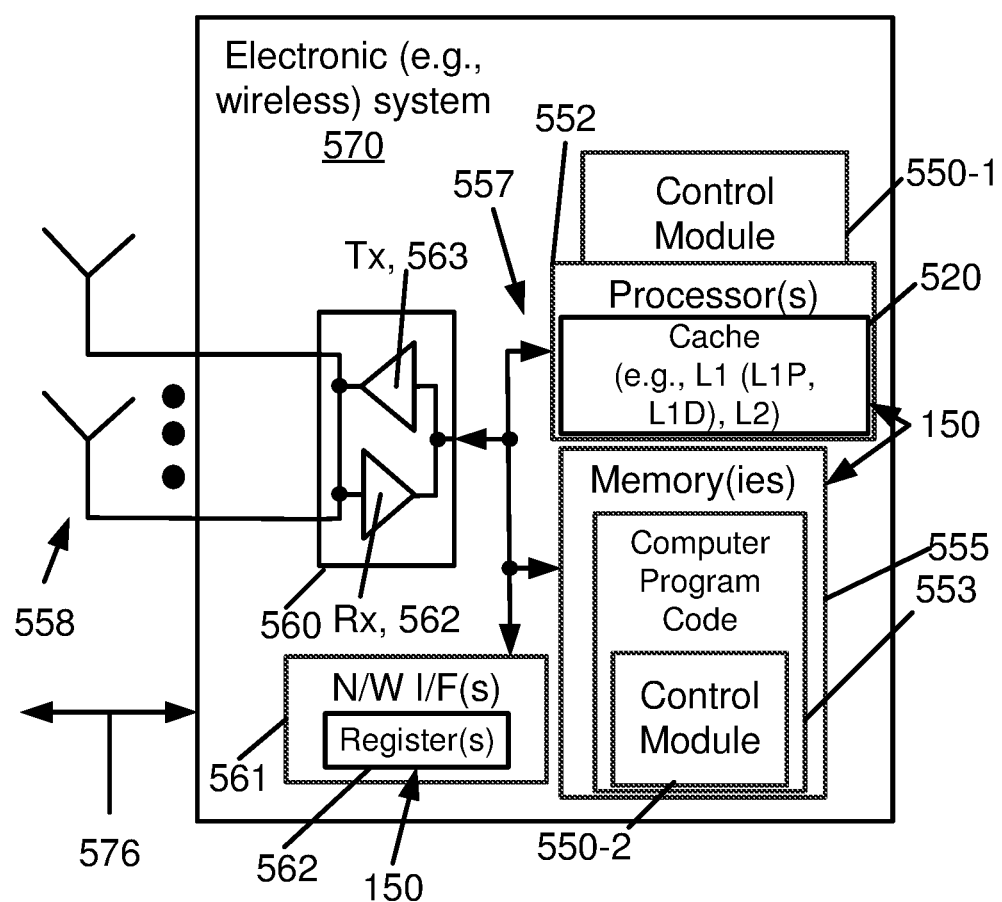
FIG. 5 is a block diagram of an exemplary electronics (e.g., wireless) system in which the examples may be practiced.

Turning to FIG. 5, this shows an electronic system 570 suitable for implementing the techniques herein. The electronic system 570 is shown as a wireless system, such as a base station that provides access by wireless devices to a wireless network. This is, however, not a limitation and other electronic systems may be used.

The electronic system 570 includes circuitry comprising one or more processors 552, one or more memories 555, one or more network interfaces (N/W I/F(s)) 561, and one or more transceivers 560 interconnected through one or more buses 557. Each of the one or more transceivers 560 includes a receiver, Rx, 562 and a transmitter, Tx, 563. The one or more transceivers 560 are connected to one or more antennas 558. The one or more memories 555 include computer program code 553.

The memory/memories 555 is a "main" memory, typically comprises f SRAM and/or DRAM. The one or more processors 552 include a cache 520, which may include an LIP part and an LID part of an L1 part, and an L2 part. These form part or all of the memory devices 150 illustrated in FIG. 1 The exemplary embodiments typically look at bit flips or other radiation effects in the cache 520, though the main memory 555 may also be examined for such radiation effects. Other elements of the system may also be examined for radiation effects, as many elements throughout the system 570 can have memories, e.g., in the form of registers 562 used, e.g., when transferring data between elements of the system 570. As an example, the N/W I/F 561 is shown with register(s) 562, which may also form part of the memory devices 150.

The electronic system 570 includes a control module 550, comprising one of or both parts 550-1 and/or 550-2. The control module can implement part or all of the system 100 of FIG. 1, and part or all of the real-time closed-loop self-optimization algorithm 300, and may implement the actions for flowcharts in FIGS. 2 and 4. The control module 550 which may be implemented in a number of ways. The control module 550 may be implemented in hardware as control module 550-1, such as being implemented as part of the one or more processors 552. The control module 550-1 may be implemented also as an integrated circuit or through other hardware such as a programmable gate array. In another example, the control module 550 may be implemented as control module 550-2, which is implemented as computer program code 553 (e.g., containing instructions) and is executed by the one or more processors 552. For instance, the one or more memories 555 store instructions in the computer program code 553, and the instructions, when executed by the one or more processors 552, cause the electronic system 570 to perform one or more of the actions as described herein.

The one or more network interfaces 561 communicate over a network such as via the links 576. For example, two or more electronic devices 570 may communicate using, e.g., link 576. The link 576 is wired. The one or more buses 557 may be address, data, or control buses, and may include any interconnection mechanism, such as a series of lines on a motherboard or integrated circuit, fiber optics or other optical communication equipment, wireless channels, and the like.

Without in any way limiting the scope, interpretation, or application of the claims appearing below, a technical effect or advantage of one or more of the example embodiments disclosed herein is an increase in the overall robustness of electronics systems against radiation-induced SEE. Another technical effect or advantage of one or more of the example embodiments disclosed herein is an increase electronic systems availability in terms of a corresponding increase of MTTR. Another technical effect or advantage of one or more of the example embodiments disclosed herein is the techniques reduce the likelihood/frequency of system hangs due to SEE. Another technical effect or advantage of one or more of the example embodiments disclosed herein is that re-use of COTS equipment is enabled with subsequent overall solution cost reduction.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 5. A computer-readable medium may comprise a computer-readable storage medium (e.g., memories 520 or 555 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory. The term "non-transitory", as used herein, is a limitation of the medium itself (i.e., tangible, not a signal) as opposed to a limitation on data storage persistency (e.g., RAM, random access memory, versus ROM, read-only memory).

The memory/memories may be means for providing storage functions. The processor(s) may be means for performing any of the functions described herein. It is further noted that the processor, memory, and example algorithms, encoded as instructions, programs, or code, may be means for providing or causing the performance of any operations described herein.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

4G fourth generation
BTS base transceiver station
CGR cosmic galactic ray
COTS commercial off-the-shelf
DRAM dynamic random-access memory
EDAC error detection and correction
FPGA field programmable gate array
L1 level 1
L1P level 1 program (or instruction) cache
L1D level 1 data cache
L2 level 2
LTE long term evolution
MAE mean absolute error
MC memory controller
ML machine learning
MSE mean squared error
MTTR mean time to reset
NASA National Aeronautics and Space Administration
SCO SEU controller and optimizer
SDL SEU detector logic
SEB single event burnout
SEE single event effect
SEL single event latchup
SEU single event upset
SPL system performance logic
SPM system performance metric
SRAM static random-access memory
SoC system on a chip

What is claimed is:

1. A method, comprising:
fetching, by an electronic device, first information from memory devices concerning errors associated with radiation effects in the memory devices, wherein the errors are assumed to be caused by radiation, and storing the fetched first information in storage;
fetching, by the electronic device, second information about system performance associated with the electronic device, and storing the fetched second information in the storage;
monitoring, by the electronic device, current parameters of the memory devices, and storing monitored current parameters in the storage;
calculating, by the electronic device in real-time using an algorithm, parameter values for configuration of the memory devices based on the fetched first information, the fetched second information, and the monitored current parameters to determine calculated parameter values, the calculating performed to adjust the parameter values to improve a metric of the system performance against the errors associated with the radiation effects, wherein the algorithm uses a list of system performance metric values determined using a machine learning model that has been trained with data collected during testing of the electronic device under a radiation flux, wherein the calculating comprises learning new parameters of the machine learning model using retrieved stored first information, retrieved stored second information, and retrieved stored monitored current parameters to revise the system performance metric values in the list;
implementing by the electronic device the calculated parameter values for the configuration of the memory devices;
iterating the fetching the first information, fetching the second information, monitoring, and calculating; and
modifying, in real-time using the algorithm that uses the revised system performance metric values from the machine learning model with the new parameters, configurations of the memory devices to address the errors that are assumed to be caused by radiation.

2. The method according to claim 1, wherein fetching first information from the memory devices comprises fetching the first information concerning bit flips caused by the radiation effects in the memory devices.

3. The method according to claim 1, wherein fetching second information about the system performance comprises fetching the second information as one or more of system resets, capacity indicators, memory utilization, or temperature of one or more devices in the electronic device.

4. The method according to claim 1, wherein monitoring the current parameters of the memory devices comprises monitoring one or more of the following: cache sizes, scrubbing frequency of caches, or memory invalidation frequency of parts of the caches.

5. The method according to claim 1, where fetching the first information, the fetching the second information, and the monitoring are run in parallel during the iterating, and the fetching the first information, the fetching the second information, and the monitoring are run at different configurable rates.

6. The method according to claim 1, wherein implementing the calculated parameter values for the configuration of the memory devices further comprises feeding indications of the calculated parameter values to the memory devices.

7. The method according to claim 1, further comprising, as part of the iterating, in response to the calculating, taking one or more actions when a rate of errors associated with the radiation effects increases in order to avoid a system halt or malfunction.

8. The method according to claim 1, wherein the calculating uses a Bayesian optimization hyperband algorithm to calculate the parameter values, and the Bayesian optimization hyperband algorithm learns relationships between memory parameters and the metric of system performance during the iterating and over a period and uses learned knowledge to provide new memory parameter values as the determine calculated parameter values.

9. The method according to claim 1, wherein the memory devices comprise level 1 and level 2 caches for associated one or more processors.

10. An electronic device, comprising:
at least one processor; and
at least one memory storing instructions that, when executed by the least one processor, cause the electronic device to perform:
fetching first information from memory devices in the at least one memory concerning errors associated with radiation effects in the memory devices, wherein the errors are assumed to be caused by radiation, and storing the fetched first information in storage;
fetching second information about system performance associated with the electronic device, and storing the fetched second information in the storage;
monitoring current parameters of the memory devices, and storing monitored current parameters in the storage;
calculating, in real-time using an algorithm, parameter values for configuration of the memory devices based on the fetched first information, the fetched second information, and the monitored current parameters to determine calculated parameter values, the calculating performed to adjust the parameter values to improve a metric of the system performance against the errors associated with the radiation effects, wherein the algorithm uses a list of system performance metric values determined using a machine learning model that has been trained with data collected during testing of the electronic device under a radiation flux, wherein the calculating comprises learning new parameters of the machine learning model using retrieved stored first information, retrieved stored second information, and retrieved stored monitored current parameters to revise the system performance metric values in the list;

implementing the calculated parameter values for the configuration of the memory devices;

iterating the fetching the first information, fetching the second information, monitoring, and calculating; and modifying, in real-time using the algorithm that uses the revised system performance metric values from the machine learning model with the new parameters, configurations of the memory devices to address the errors that are assumed to be caused by radiation.

11. The electronic device according to claim 10, wherein fetching first information from the memory devices comprises fetching the first information concerning bit flips caused by the radiation effects in the memory devices.

12. The electronic device according to claim 10, wherein fetching second information about the system performance comprises fetching the second information as one or more of system resets, capacity indicators, memory utilization, or temperature of one or more devices in the electronic device.

13. The electronic device according to claim 10, wherein monitoring the current parameters of the memory devices comprises monitoring one or more of the following: cache sizes, scrubbing frequency of caches, or memory invalidation frequency of parts of the caches.

14. The electronic device according to claim 10, where fetching the first information, fetching the second information, and the monitoring are run in parallel, and the fetching the first information, the fetching the second information, and the monitoring are run at different configurable rates.

15. The electronic device according to claim 10, wherein implementing the calculated parameter values for the configuration of the memory devices further comprises feeding indications of the calculated parameter values to the memory devices.

16. The electronic device according to claim 10, wherein the instructions, when executed by the least one processor, further cause the electronic device to perform: in response to the calculating, taking one or more actions if a rate of errors associated with the radiation effects increases in order to avoid a system halt or malfunction.

17. The electronic device according to claim 10, wherein the algorithm comprises a Bayesian optimization hyperband algorithm.

18. The electronic device according to claim 10, wherein the calculating further comprises sending a list of sets of memory configuration parameters to the machine learning model to be analyzed by the machine learning model and used for training, wherein the machine learning model returns a system performance metric value for individual ones of the sets of memory configuration parameters that correspond to the list, and wherein the algorithm selects memory configuration parameters that correspond to a best system performance metric value from multiple system performance metric values received from the machine learning model and uses the selected memory configuration parameters for the modifying the configurations of the memory devices.

19. The electronic device according to claim 18, wherein the modifying comprises periodically retrieving latest memory configuration parameters and system performance metric values from storage and using the retrieved latest memory configuration parameters and the retrieved system performance metric values to learn new parameters of the model.

20. The electronic device according to claim 18, wherein the list of sets of memory configuration parameters comprises information about changed cache sizes, information about scrubbing frequency of caches, and information about memory invalidation frequency of parts of the caches.

* * * * *